Aug. 18, 1931.  G. R. POYER  1,819,825
INTERNAL COMBUSTION ENGINE
Filed Oct. 22, 1928
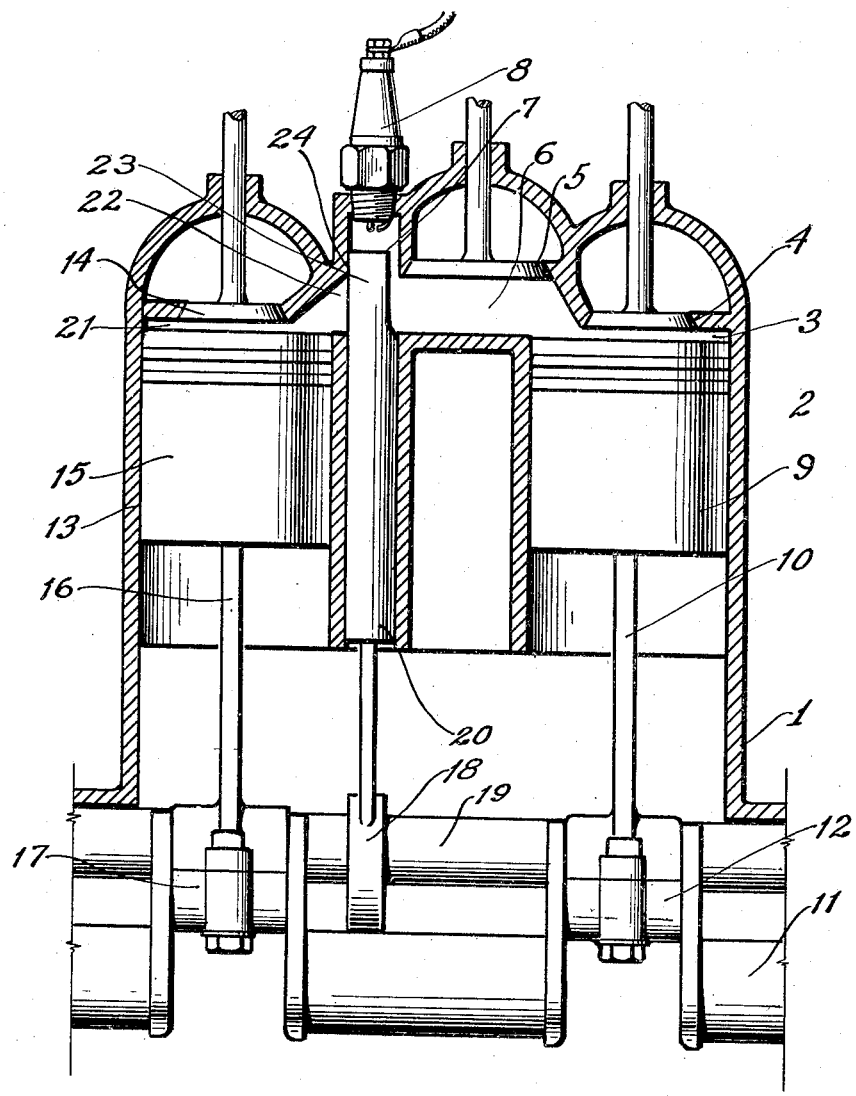
INVENTOR
Guy R. Poyer
BY
B. F. Funk, ATTORNEY Patented Aug. 18, 1931

1,819,825

UNITED STATES PATENT OFFICE

GUY R. POYER, OF WICHITA, KANSAS

INTERNAL COMBUSTION ENGINE

Application filed October 22, 1928. Serial No. 313,982.

This invention relates to internal combustion engines and particularly to an engine of the dual type in which one cylinder is provided with a combustion chamber, the other with a compression chamber in which the compression ratio may be boosted to a much higher degree than is practicable in conventional types of engines and also much higher than the compression pressure of the other cylinder so that when the two pressures are permitted to combine, the resultant compression pressure of the two cylinders would be increased considerably and be much higher than the conventional type of internal combustion engines.

In carrying out my invention, I employ certain novel constructive details and combination of parts all of which will be specifically described hereinafter, reference being had to the accompanying drawings in which the figure is a sectional view through a double cylinder engine constructed in accordance with my invention.

Referring now to the drawing by numerals of reference, 1 designates the engine block having a cylinder 2 with a combustion chamber space 3, an inlet 4 and an exhaust valve 5. The exhaust valve 5 is offset with respect to the major portion of the compression and combustion space 3 and there is an offset chamber 6 beneath the valve 5, which communicates with an ignition chamber 7 in the head, provided with a spark plug 8. Within the cylinder 2 is a piston 9 having a connecting rod 10 connected to the crank shaft 11 by a bearing 12 in the usual manner.

Co-operating with the cylinder 2 is a compression booster cylinder 13 having an air inlet valve 14 in the head. The piston 15 is connected to the crank shaft 11 by a connecting rod 16 and a bearing 17 in the usual manner.

An eccentric 18 on a combination cam and eccentric shaft 19 is connected to a slide valve 20. This valve may be substituted by any type of valve to close the port or passage between the cylinders, combustion chambers or compression chambers, known as poppet valves, sleeve valves, slide valves or piston valves, valves being operated by either cams, cranks or eccentrics, which are adapted to close off communication between the compression space 21 of cylinder 13 and the chamber 7, but which permits constant communication between the space 6 and the chamber 7. The connecting rods 10 and 16 are connected to the crank shaft on the same angle so that they move inwardly and outwardly simultaneously. Air is admitted to the cylinder 13 through a throttle passage, distinct from the throttle passage of the carburetor which feeds the combustible mixture to the cylinder 2. Each of the separate throttles operating upon the same control so that the air and mixture passages going into the respective throttles will be in the same volume, giving each of the cylinders an equal amount of fluid in order that the combustible contents of the cylinders may at all times be constant. The piston 15 compresses the air to about fifteen atmospheres or to about 225 pounds. Since the air is non-combustible, no possibility of pre-ignition occurs. The fuel charge in cylinder 2 is compressed to about seven atmospheres or 105 pounds and the mixture recommended is about eight parts air to one of gas or hydrocarbon content by weight. As the two pistons move on their compression stroke, the valve 20 closes off the outlet port 22 of the cylinder 13 with the chamber 7 but by reason of the fact that the upper end 23 of the valve 20 is constricted on the side facing cylinder 2, the chamber 7 will not be closed off from communication with the space 6. A properly constructed timing device (not shown) causes the spark plug to fire when both pistons are at top dead center positions, that is, when the air is compressed to the fullest extent. At this approximate period, the valve 20 cracks the port 22 admitting the high pressure air from cylinder 13 to expand into combustion chambers 6 and 7, the difference in pressure being approximately 2½ to 1 ratio, the air from the high pressure chamber 21 passing through port 22 will move at such high velocity that it will create high turbulence, the effect of the air escaping through the cracked port 22 will break it up and mix it thoroughly with the rich mixture in chambers 6 and 7 which is doubly rich with hydrocarbon content for proper combustion, the volume of air from chamber 21 and the volume of mixture from chambers 6 and 7 are equal. This process of mixing would dilute the mixture to a point of approximately 16 parts of air to 1 part of fuel by weight, which is approximately the proper mixture for complete combustion. After the opening of port 22 during the combustion, power stroke and scavenging stroke cylinder 13, compression chamber 21, ignition chamber 7, combustion and compression chamber 6 and cylinder 2 are intercommunicating. During the intake stroke, chamber 21 and cylinder 13 only are intercommunicating. During the compression stroke, cylinder 13 and chamber 21 are intercommunicating. During the intake stroke, chamber 6 and chamber 7 and chamber 3 and cylinder 2 are intercommunicating. At about the time the ignition of the gas in chamber 7 takes place, the pistons move outwardly. As soon as the upper end of valve 20 moves off seat 24, the compressed air in chamber or space 21 will exhaust from cylinder 13, flowing over the top of the valve into space 6 on top of piston 9, creating turbulence so that the combusted charge and the air will co-mingle and since the combusted charge creates pressure many times in excess of the initial unexploded compressed charge, the resultant of the compression previously created in cylinder 13 and the pressure created by the exploded charge will be very high, acting upon both pistons in cylinders 2 and 13 which now intercommunicate so that the power exerted on the crank shaft will be very much greater than would be possible unless the cylinder 13 and its appurtenances or their equivalent were employed.

The smaller the combustion chamber, the less energy is wasted in filling up this space and the saved energy can be applied to drive the piston outward.

On the inward stroke or compression stroke of the engine, the mixture in the cylinder is confined to the smallest possible space in the combustion chamber, that is, within the limits of safety below the temperature that would create pre-ignition.

In the case of this engine, the mixture taken into the fuel cylinder is relatively rich, thereby making it a very poor combustible substance and the temperature or heat created by the compression of this mixture on the compression stroke would have to be much higher in order to ignite this mixture by reason of its own, heat generated, whereas in conventional type engine a compression ratio of 5 to 1 or pressure of approximately 75 pounds has been the limit for compression ratios. Inasmuch as in this engine, the mixture taken into the fuel cylinder is mixed with air taken into the compression cylinder and the two are thoroughly mixed at the top dead center of the stroke, or approximately the time of the ignition, it is possible to use this very rich mixture in the fuel cylinder and protect this mixture from the heat generated from the high pressure cylinder through means of the valve 20, separating the cylinders. The mixture in the fuel cylinder will stand a compression ratio of approximately 7 to 1 without igniting from the heat generated because of the fact that it is so rich it is not easily ignited, thereby increasing the compression ratio in the fuel cylinder to approximately 7 to 1 and the compression ratio in the non-fuel cylinder 15 to 1, would make a resultant compression pressure for the two cylinders at the time of ignition 10 to 1.

Heat being the common enemy of the engine during the compression stroke and being the reason for having to hold the compression ratio of the mixture within safety limits to protect it from the heat generated by compression, it is important to admit the fuel in such condition to prevent pre-ignition. The temperature of the cylinder is effected by means of expanding the air from the high compression cylinder into the chamber containing the combustible fluid in this respect when the air is taken into the high compression cylinder and during its compression stroke, the heat generated is carried away to a certain degree by radiation through the cooling system of the motor and when the valve 20 opens port 22, allowing this air to expand into the combustion chamber, it will have a cooling effect upon the gases holding the temperature down which would make it possible to admit this air into the combustion chamber a little before top dead center as the temperature would have a tendency to fall, which is beneficial to keeping down the pre-ignition which is set up by increased temperatures caused by compression.

It will be apparent that the dual cylinders working in pairs, one receiving a non-combustible, non-pre-igniting fluid compressed to high pressure and the other receiving a combustible mixture compressed to pressures within limits of safety, both intercommunicating at the time of combustion in the latter cylinder, will provide a motor of high efficiency and considerably of greater power than is possible with present conventional motors of equal displacement. The pressures hereinbefore given are merely approximate, it being obvious that these may be varied without departing from the spirit of my invention or sacrificing any of its advantages.

What I claim and desire to secure by Letters-Patent is:—

An internal combustion engine comprising two cylinders, one of which is a fuel cylinder and the other an air cylinder, a combustion chamber connecting the two cylinders, the combustion chamber having a pocket therein near the air cylinder, a spark plug in said pocket, pistons in the cylinders, a piston valve to alternately open and close communication between the air cylinder and the combustion chamber and the pocket while maintaining open communication between the pocket and the combustion chamber and a crank shaft connected to the pistons and driving the piston valve.

In testimony whereof I affix my signature.

GUY R. POYER.